US006389138B1

(12) United States Patent
Li et al.

(10) Patent No.: US 6,389,138 B1
(45) Date of Patent: May 14, 2002

(54) METHOD AND APPARATUS FOR GENERATING A COMPLEX SCRAMBLING CODE SEQUENCE

(75) Inventors: Quinn Li, Madison; Nallepilli S. Ramesh, New Providence, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/190,195

(22) Filed: Nov. 12, 1998

(51) Int. Cl.[7] ................................................ H04K 1/00
(52) U.S. Cl. ............................ 380/35; 380/31; 380/38; 455/103; 455/454; 370/209; 375/246
(58) Field of Search ............................ 380/270, 31, 35, 380/38; 370/204, 206, 208, 209; 375/130, 246; 455/454, 102, 103

(56) References Cited

U.S. PATENT DOCUMENTS

| 5,103,459 | A | * | 4/1992 | Gilhousen et al. .............. 375/1 |
| 5,309,474 | A | * | 5/1994 | Gilhousen et al. .............. 375/1 |
| 5,414,728 | A | | 5/1995 | Zehavi ........................ 375/200 |
| 5,416,797 | A | * | 5/1995 | Gilhousen et al. ........... 375/705 |
| 5,497,395 | A | * | 3/1996 | Jou ............................. 375/205 |
| 5,532,695 | A | | 7/1996 | Park et al. ................... 341/173 |
| 5,715,236 | A | * | 2/1998 | Gilhousen et al. ........... 370/209 |
| 6,222,828 | B1 | * | 4/2001 | Ohlson et al. ............... 370/320 |

FOREIGN PATENT DOCUMENTS

EP    WO 92/00639    6/1990    ........... H04L/27/30

OTHER PUBLICATIONS

Kevin Laird, Motorola, Inc., "Proposed RTT Text for cdma2000 Reverse Link Complex Spreading," TR45.5.4/98.06.15.23, pp. 1 thru 4.

Joe Odenwalder, QUALCOMM Incorporated, "A Block Diagram of HPSK with IS–95–C (Issue 48)," TR45.5.3.1/98.08.18.08, p. 1.

Kevin Laird, Motorola, Inc., "Complex Long Codes for the cdma2000 Reverse Link," TR45.5.4/98.05.11.13, pp. 1 thru 5.

Kevin Laird, Motorola, Inc., "Melthods of Reverse Link Long Code Generation for cdma2000," TR45.5.3.1/98.10.19.07, pp. 1 thru 8.

* cited by examiner

*Primary Examiner*—Albert Decady
*Assistant Examiner*—Paul E. Callahan
(74) *Attorney, Agent, or Firm*—Julio A. Garceran

(57) ABSTRACT

A complex spreading and/or scrambling code sequence generation system uses a first complex code sequence having at least two components and a second complex code sequence having at least two components. The components of the first complex code sequence are respectively mixed with the corresponding components of the second complex code sequence to generate the complex scrambling code sequence. In doing so, an offset between the components of the complex scrambling code sequence is achieved for the same and/or different users. The complex scrambling code sequence can be used for spreading, scrambling, de-spreading or descrambling an information signal.

17 Claims, 8 Drawing Sheets

METHOD AND APPARATUS FOR GENERATING A COMPLEX SCRAMBLING CODE SEQUENCE

BACKGROUND OF THE INVENTION

1. Field of The Invention

This invention relates to wireless communications and, more particularly, to a system for generating a complex scrambling code sequence.

2. Description of Related Art

FIG. 1 depicts a schematic diagram of a portion of a typical wireless communications system 10, which provides wireless communications service to a number of wireless units 12a–c, such as mobile or fixed units, that are situated within a geographic region. The heart of a typical wireless communications system is a Mobile Switching Center ("MSC") 14, which might be known also as a Wireless Switching Center ("WSC") or a Mobile Telephone Switching Office ("MTSO"). Typically, the Mobile Switching Center 14 is connected to a plurality of base stations, such as base stations 16a–c, that are dispersed throughout the geographic area serviced by the system and to the local and long-distance telephone offices, such as local-office 18, local-office 20 and toll-office 22). The Mobile Switching Center 14 is responsible for, among other things, establishing and maintaining calls between the wireless units and calls between a wireless unit and a wireline unit (e.g., wireline unit 24), which wireline unit is connected to the Mobile Switching Center 14 via the local and/or long-distance networks.

The geographic area serviced by a wireless communications system is divided into spatially distinct areas called "cells." As depicted in FIG. 1, each cell is schematically represented by one hexagon in a honeycomb pattern; in practice, however, each cell has an irregular shape that depends on the topography of the terrain surrounding the cell and other factors. Typically, each cell contains a base station, which comprises the radios and antennas that the base station uses to communicate with the wireless units in that cell and also comprises the transmission equipment that the base station uses to communicate with Mobile Switching Center 14. For example, when wireless terminal 12b desires to communicate with wireless unit 12c, wireless unit 12b transmits the desired information to base station 16c, which relays the information to Mobile Switching Center 14. Upon receipt of the information, and with the knowledge that it is intended for wireless unit 12c, Mobile Switching Center 14 then returns the information back to base station 16c, which relays the information, via radio, to wireless unit 12c.

In a spread spectrum wireless communications system, the information signal or baseband data sent between the base station 16c and the mobile unit 12c is multiplied by a spread spectrum signal. Certain spread spectrum systems, such as code-division multiple access (CDMA) systems, spread and/or scramble the baseband data information signal by multiplying the information signal with a spreading and/or scrambling code sequence ("scrambling code sequence"), such as a pseudo-noise (PN) code which is a binary sequence that appears random but can be reproduced by the intended receiving station. When the scrambling code sequence has the same pulse rate as the information signal, the product of the scrambling code sequence and the information signal is scrambled, and the spectrum is unchanged. When the scrambling code sequence has a faster pulse rate than the information signal, the product of the scrambling code sequence and the information signal has its spectrum spread in addition to being scrambled. A single pulse of the scrambling code sequence is called a chip.

FIG. 2 shows a general block diagram of a CDMA transmitter 30 and receiver 31. The CDMA transmitter 30 spreads and/or scrambles the information or data signal to produce a spread spectrum signal for transmission, and the CDMA receiver 31 de-scrambles and/or de-spreads the spread spectrum signal to retrieve the information or data signal. At the transmitter 30, the original data is manipulated by the coder and/or processing block 32, which can perform speech coding, channel coding, bit interleaving, digital modulation as well as other functions, to produce the information or data signal D(t) ("information signal"). A scrambling code sequence generator 33 generates the scrambling code sequence, and a multiplier 34 multiplies the scrambling code sequence with the information signal D(t) to produce the wide band or spread spectrum information signal y(t). Modulator 35 modulates the spread spectrum information signal onto a carrier signal, for example using quadrature modulation, after which the spread spectrum signal is transmitted to the receiver 31. At the receiver 31, a demodulator 36 demodulates the signal transmitted from the transmitter 30 to produce the spread spectrum information signal y(t). The spread spectrum signal y(t) is multiplied by a multiplier 37 with a locally-generated version of the scrambling code sequence from a scrambling code generator 38. The multiplication with the correct scrambling code sequence de-spreads and/or de-scrambles the spread spectrum signal y(t) and restores the information signal D(t). Multiplying the spread spectrum signal y(t) from an undesired user with the scrambling code sequence results in a small amount of noise. A decoder and deprocessing block 39 manipulates the information signal D(t) to obtain the original data.

As shown, each process in the transmitter 30 has a peer in the receiver 31. When data is being transmitted from the base station and received by the wireless unit, the data is being sent over the forward link. When data is being transmitted from the wireless unit and received by the base station, the data is being sent over the reverse link. In current CDMA systems, there are differences between the forward link and reverse link processes as well as differences in how the scrambling code sequence is generated.

FIG. 3 shows how the reverse link scrambling code sequence is generated for the TIA/EIA-95-B standard ("IS-95B") using a $(2^{42}-1)$ bit long code and a $2^{15}$ bit complex short code. A long code generator 40 generates a long code sequence which is the inner product of a 42-bit user mask 41, which is uniquely assigned to each user, and a 42-bit long code vector which is the state of a long code generator engine 42. The long code generator engine 42 can be based on a shift register which maintains the long code vector or state of the shift register, and the mask 41 is used select bits from the long code vector which are exclusive-ord (for example, using AND gate arrangement 43 and mod 2 summer 44) to produce the long code sequence. By performing the masking operation with the user specific mask 41, the long code is effectively time shifted a different amount for each user to produce the long code sequence. As such, the base station can identify the particular user. In IS-95B, where quadrature spreading and modulation is used, the long code sequence is provided to a quadrature spreader 45. Quadrature spreading ensures that other user interference appears to have random phase and amplitude.

The quadrature spreader and/or scrambler 45 multiplies long code sequence with the complex short code sequence. The complex short code sequence is generated using two independent generator polynomials of degree 15 as described in IS-95B to produce the in-phase (I) and quadrature (Q) short code sequences of the complex short code sequence. The I and Q short code sequences are chip synchronous, but otherwise independent of each other. An in-phase (I) mixer 46 effectively multiplies the long code sequence with the I short code sequence, and a quadrature mixer 47 effectively multiplies the long code sequence with the Q short code sequence. As such, the quadrature spreader 45 produces an I scrambling code sequence and a Q scrambling code sequence. In IS-95B, both the I spreading code sequence and the Q spreading code sequence are multiplied with the information signal D(t) to produce the I and Q spread spectrum signals $y_i(t)$ and $y_q(t)$ which are quadrature modulated and transmitted to the base station after being added together. Accordingly, multipliers 48a–b respectively multiply the information signal D(t) with the I spreading code sequence and the Q spreading code sequence to produce the in-phase spread spectrum signal $y_i(t)$ and the quadrature spread spectrum signal $y_q(t)$. Alternatively, the quadrature spreader 45 multiplies the short complex code with the product of the information signal D(t) and the long code sequence. As such, the information signal signal D(t) can be multiplied with the long code sequence by a multiplier 49 before the quadrature spreader 45 in which case the information signal D(t) is scrambled by the quadrature spreader 45 and has already been spread by the multiplication with the long code sequence.

FIG. 4 shows an embodiment of the long code sequence generator 40 of FIG. 3. The long code sequence generator 40 includes a long code generator engine 42, such as a linear feedback shift register with a 42 bit fixed generator polynomial 51. Initially, the current state of for the shift register is received by the mobile unit over the sync channel and loaded into the shift register as would be understood by one of skill in the art. The shift register is then clocked, and the 42 bit code vector or current state of the shift register is applied to the AND gate arrangement 43 along with the user mask 41. The outputs of the AND gate arrangement 43 are applied to the modulo 2 summer 44. The modulo 2 summer 44 produces the long code sequence which is a time shifted version of the long code. The time offset being introduced by the user mask 41.

Proposed CDMA systems referred to as cdma2000 propose using a reverse channel consisting of several physical channels: a reverse pilot channel which is always used, a reverse fundamental channel (R-FCH), one or more supplemental channel (R-SCH) and a reverse dedicated control channel (R-DCCH). Each physical channel is spread using a Walsh code sequence to provide orthogonal channelization among the physical channels. Unlike IS-95B where the data signal D(t) is provided to both the I path and the Q path, the spread pilot and R-DCCH are mapped to the in-phase (I) data path, and the spread R-FCH and R-SCH are mapped to the quadrature (Q) path to form the composite reverse link signal. Then, the I and Q data signals $D_i(t)$ and $D_q(t)$ are scrambled by a complex scrambling code sequence by using a complex multiply operation. Because of the proposed reverse channel structure, the proposed CDMA systems use a complex long code sequence (whose I and Q components are two different real long codes) as the scrambling code sequence which is unique to each user. Various techniques for generating the complex scrambling code sequence have been proposed.

FIG. 5 shows a complex scrambling code generator 50 using one long code sequence generator engine 52 and two 42-bit user masks, an I-mask 54 and a Q-mask 56. In operation, the current long code generator state 58 is received by the mobile unit over the sync channel and loaded into a 42-bit linear feedback shift register of the code generator engine 52 as described in FIG. 4. The code vector from the shift register of the code generator engine 52 is exclusive-ord with the I-mask 54, for example using an AND gate arrangement 60 and a modulo 2 summer 62, to produce the I long code sequence which is used as the I scrambling code sequence. The code vector from the register of the generator engine 52 is also exclusive-ord with the Q-mask 56, for example using an AND gate arrangement 64 and a modulo 2 summer 66, to produce the Q long code sequence which is used as the Q scrambling code sequence. The I mask 54 can be the IS-95B user mask 42 (FIG. 4), and the Q-mask 56 can be a permutation of a subset of the I-mask bits or a different set of fixed bits, for example inverting bit 32 of the I-mask 54 to get the Q-mask 56. This approach may produce self-interference problems because the relative time offset of the user's I and Q long code sequences may be small, thereby I and Q can cross interfere due to delay spread. Moreover, the relative time offset of the I long code sequence and the Q long code sequence cannot be computed easily. Thus, it would be difficult to pick user masks 54 and 56 that guarantee minimum time offset for all 4.3 billion long code sequences. Additionally, mutual interference problems can arises because there is no guaranteed delay between the I long code sequences (or Q long code sequences) of two different users. In principle, two users could interfere with each other due to path loss differences. The long code sequences of any two users should be sufficiently separated (delay>maximum difference in propagation delay).

FIG. 6 shows another complex scrambling code sequence generator 70 which uses a user mask 72 and two long code generator engines, an I long code generator engine 74 and a Q long code generator engine 76. The I long code generator engine 74 receives the current state 78 from the sync channel as called for in IS-95B, and the current state is loaded into a 42-bit linear feedback shift register of the I code generator engine 72 as described in FIG. 4. To avoid self-interference, the current state 78 is advanced by a certain number of chips (for example, 512 chips) as shown by block 80 and loaded into a 42-bit linear feedback shift register of the Q code generator engine 76. Advancing the bits of the Q state can be accomplished by loading the shift register of the Q long code generator engine 76 with the current state 78 and clocking the shift register ahead by the desired amount of chips. The I and Q long code generator engines 72 and 74 have the same generator polynomials. The code vector of the I long code generator shift register is exclusive-ord with the user mask 72, for example using an AND gate arrangement 82 and a modulo 2 summer 84, to produce the I long code sequence which is used as the I scrambling code sequence. The code vector from the Q long code generator shift register is also exclusive-ord with the user mask 72, for example using an AND gate arrangement 86 and a modulo 2 summer 88, to produce the Q long code sequence which is used as the Q scrambling code sequence. The user mask 72 can be the IS-95B user mask 42 (FIG. 4). This approach, however, increases the complexity of the circuitry and may produce mutual interference problems. Mutual interference problems can arise because among users, I long code sequences are unique and Q long code sequences are unique, but one user's Q long code could be another user's I long code. Again, mutual interference problems can arise because there is no guaranteed delay between the I long code sequences (or Q long code sequences) of two different users.

FIG. 7 shows another complex scrambling code sequence generator 90 which uses a user mask 92 and two long code generator engines, an I long code generator engine 94 and a Q long code generator engine 96. The I long code generator engine 94 receives the current I generator state 98 from the sync channel as called for in IS-95B, and the Q long code generator engine 96 receives the current Q generator state 100 from the sync channel. The I state is loaded into a 42-bit linear feedback shift register of the I generator engine 94, and the Q state is loaded into a 42-bit linear feedback shift register of the Q generator engine 96. The I and Q long code generator engines 94 and 96 have unique generator polynomials. The I long code generator engine 94 uses the IS-95B generator polynomial, and the Q long code generator engine 96 can use the reciprocal polynomial of the IS-95B generator polynomial. The code vector of the I long code generator engine 94 is exclusive-ord with the user mask 92, for example using an AND gate arrangement 102 and a modulo 2 summer 104, to produce the I long code sequence which is used as the I scrambling code sequence. The code vector from the Q long code generator engine register is also exclusive-ord with the user mask 92, for example using an AND gate arrangement 106 and a modulo 2 summer 108, to produce the Q long code sequence which is used as the Q scrambling code sequence. This approach reduces the interference problems but requires current I and Q states to be transmitted on the sync channel for both I and Q engine registers. Additionally, this system also does not guarantee the delay between the I long code sequences (or Q long code sequences) of two different users.

The mapping between the user mask value to an offset value for the long code is very complicated. Thus, a problem with the proposed schemes which employ only long code generators which are masked is the difficulty in guaranteeing the time difference between the I and/or Q scrambling code sequences of the same and/or different user's.

SUMMARY OF THE INVENTION

The present invention involves a complex spreading and/or scrambling code sequence ("scrambling code sequence") generation system which uses a first complex code sequence having at least two components and a second complex code sequence having at least two components. The components of the first complex code sequence are respectively mixed with the corresponding components of a second complex code sequence to generate the complex scrambling code sequence. In doing so, an offset between the components of the complex scrambling code sequence is achieved for the same and/or different users. For example, the complex spreading code sequence generation system can use a long code generator which produces a long code sequence produced from the inner product of a code vector and a user mask. The long code sequence is provided to an I path and a Q path. To produce a complex long code sequence, the long code sequence on the Q path is delayed to produce a second long code sequence on the Q path or a Q component of the complex long code sequence. On the I path, the I long code sequence or the I component of the complex long code sequence is mixed with an I component of a short code sequence to produce the I component of the complex scrambling code sequence. On the Q path, the Q long code sequence is mixed with a Q component of the short code sequence to produce the Q component of the complex scrambling code sequence. As such, the offset between the components of the complex scrambling code sequence for different and/or the same user is at least the period of the short code. The complex scrambling code sequence can be used for spreading, scrambling, de-spreading or de-scrambling an information signal.

BRIEF DESCRIPTION OF THE DRAWINGS

Other aspects and advantages of the present invention may become apparent upon reading the following detailed description and upon reference to the drawings in which.

DETAILED DESCRIPTION

Figure 8:
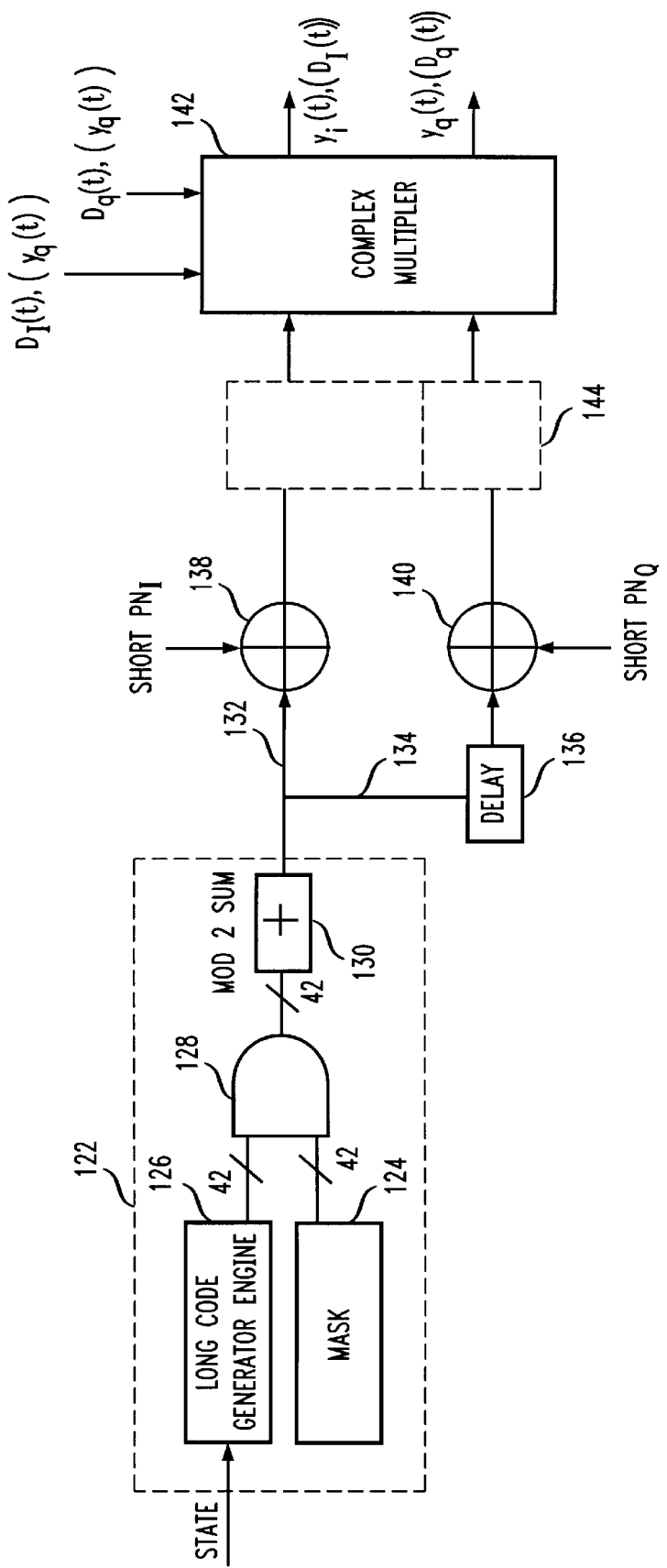
FIG. 8 shows a complex scrambling code generation system according to the principles of the present invention.

An illustrative embodiment of the complex scrambling code sequence generation system according to the principles of the present invention is described below. With particular reference to FIG. 8, a complex scrambling code sequence generation system 120 includes a code sequence, such as long code sequence generator 122, which generates a first component of a first complex code sequence, such as a long code sequence. The long code generator 122 includes a long code generator engine 126 which uses a 42-bit linear feedback shift register and a polynomial generator to produce a 42-bit code vector. The long code sequence is the inner product of a 42-bit user mask 124 and the 42-bit code vector from the long code generator engine 126. The long code generator 122 receives the current 42-bit state vector over the sync channel from the base station and loads the state vector into the shift register. Each user is assigned a unique 42-bit user mask 124, and the mask 124 is used select bits from the vector which are exclusive-ord (for example, using an AND arrangement 128 and a modulo 2 summer 130) to produce the long code sequence. By performing the masking operation with the user specific mask, the long code sequence is effectively time shifted a different amount for each user.

The long code sequence is provided to an I path 132 and a Q path 134. On the Q path 134, a delay 136 delays the long code sequence on the path 134 to produce a Q component of a complex long code sequence (Q long code sequence) which is a second component of the first complex code sequence. The Q long code sequence is delayed with respect to the I component of the long code sequence (I long code sequence) on the I path 132. On the I path 132, an I mixer 138 mixes or multiplies the I component of the long code sequence with a first component of a second complex code sequence, such as an I component of a short code sequence (I short code sequence), to produce the I component (I scrambling code sequence) of a complex scrambling code sequence. On the Q path 134, a Q mixer 140 mixes or multiplies the Q long code sequence with a second component of the complex short code sequence, such as a Q component of the short code sequence, to produce the Q component (Q scrambling code sequence) of the complex scrambling code sequence. Alternatively, a delay could be used on the I path 132 alone or delays on both I and Q paths 132 and 134 to provide a relative delay between the I and Q long code sequences. The delay between the I and Q long code sequences could be as small as one chip.

Figure 1:
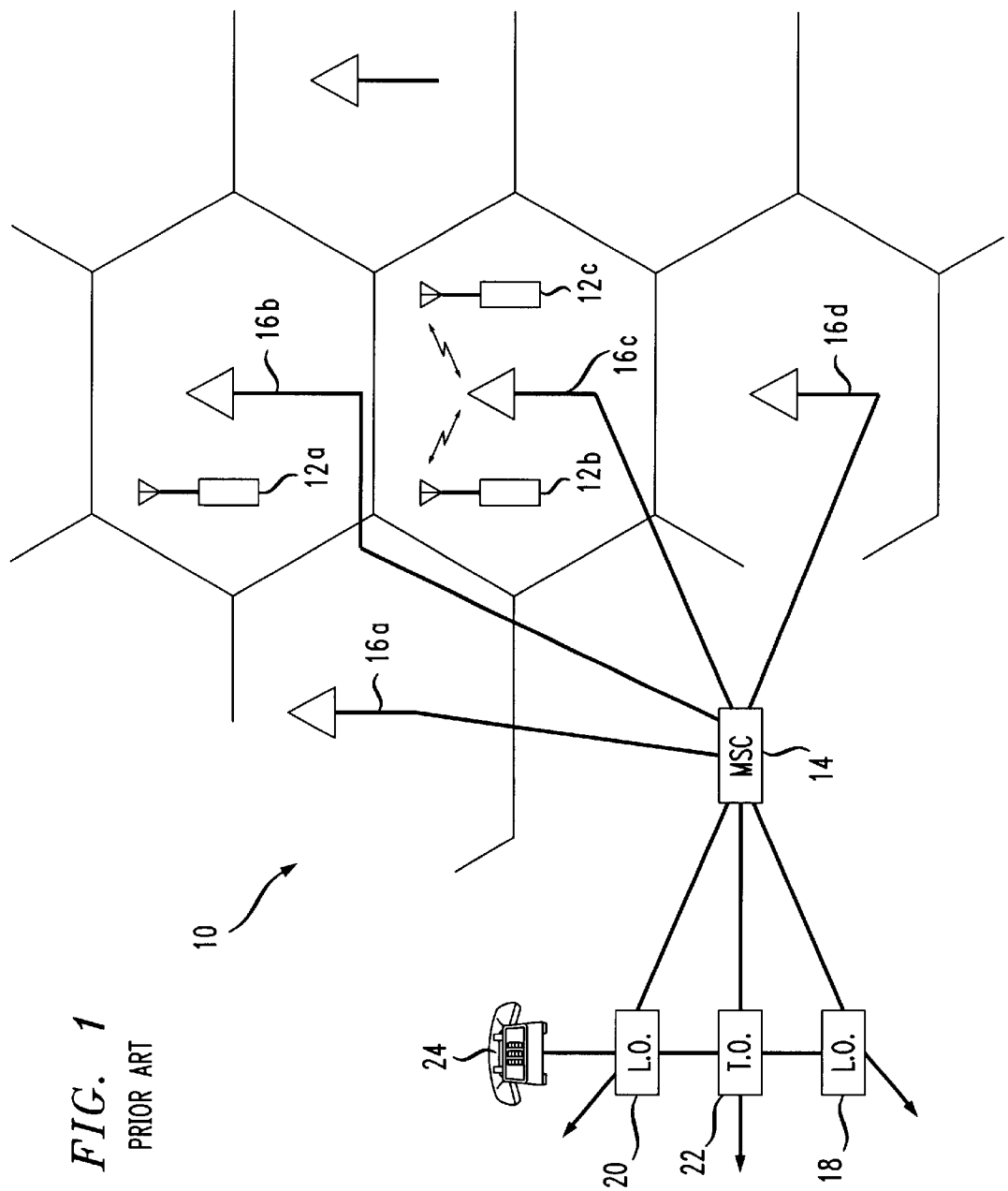
FIG. 1 shows a general diagram of a portion of a typical wireless communications system.
Figure 2:
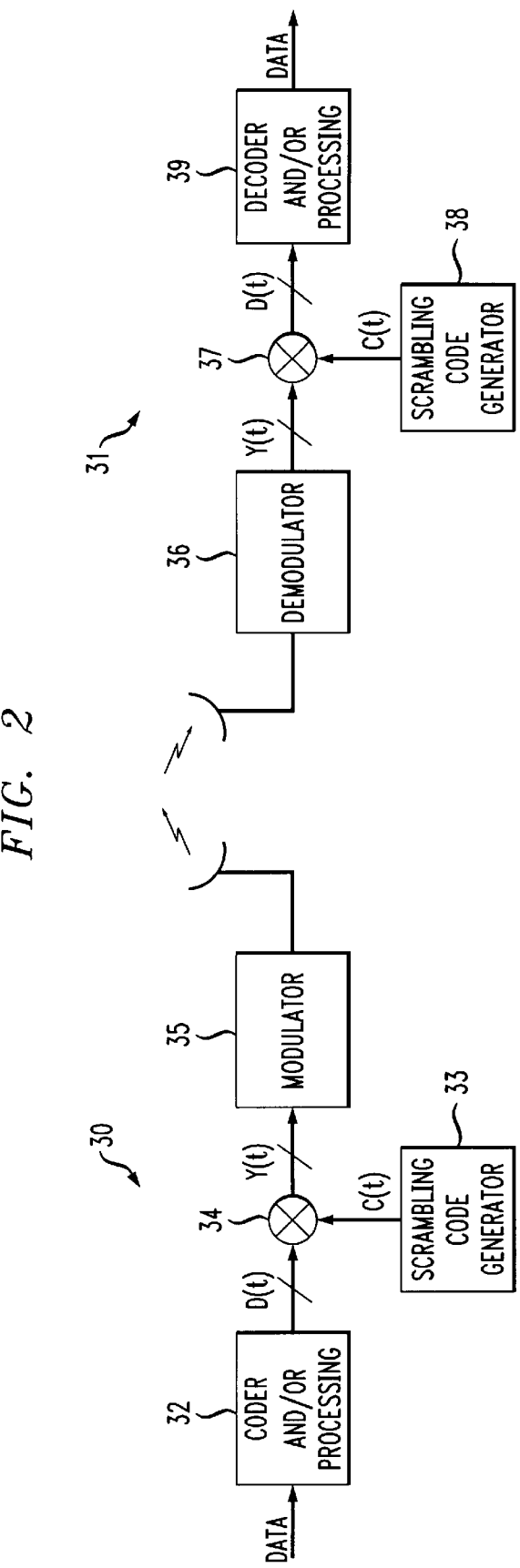
FIG. 2 shows a general block diagram of a transmitter and receiver pair in a spread spectrum communications system station architecture in the prior art.
Figure 3:
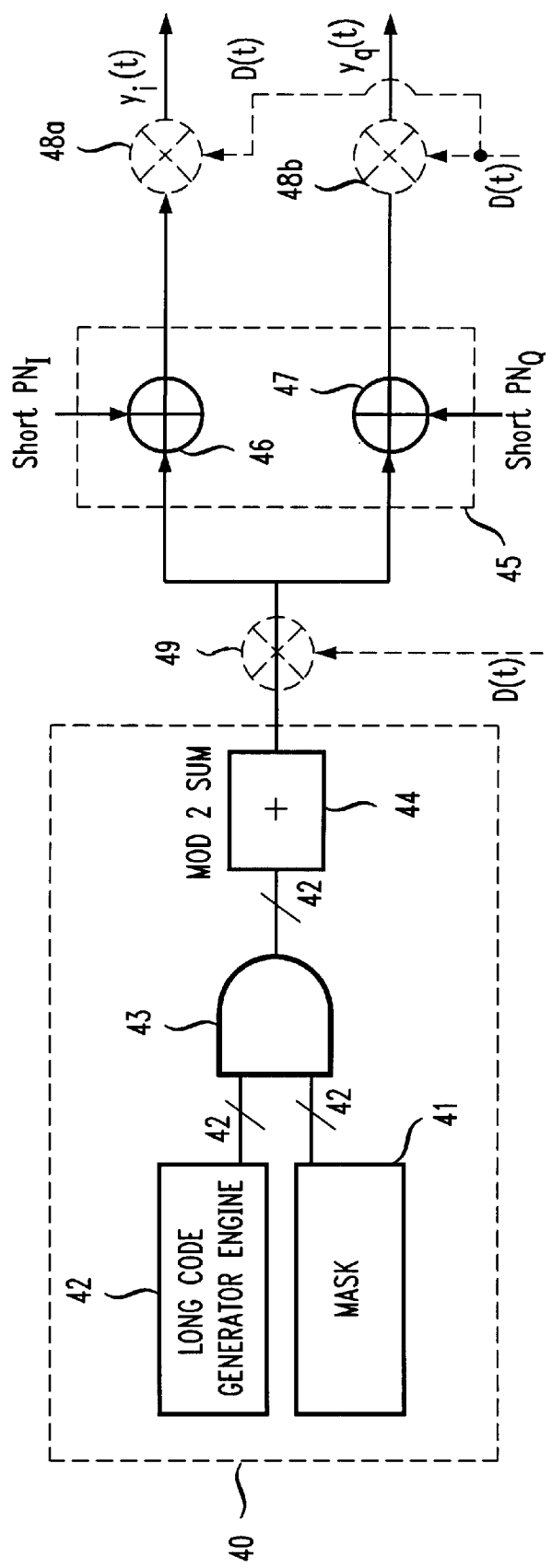
FIG. 3 shows a general block diagram of an embodiment of a current spreading code generation system.
Figure 4:
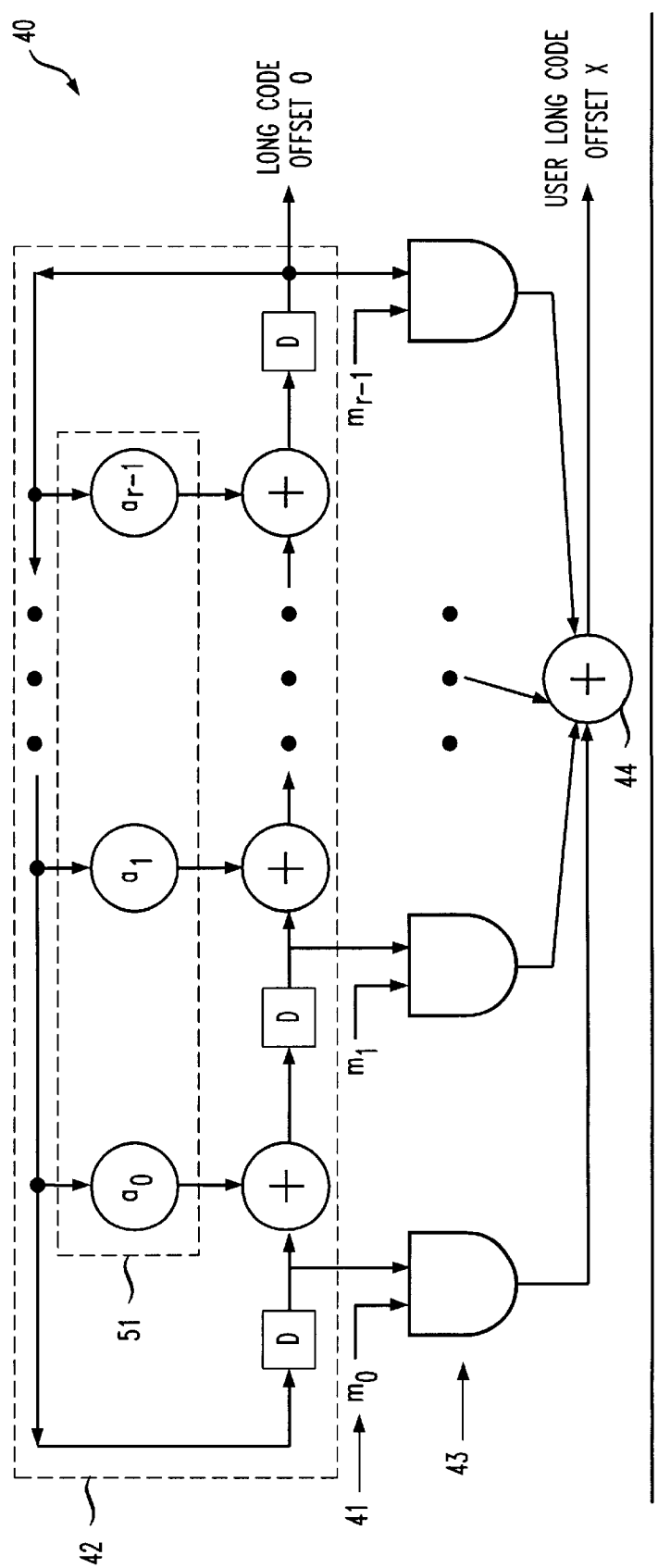
FIG. 4 shows an embodiment of a code sequence generator.
Figure 5:
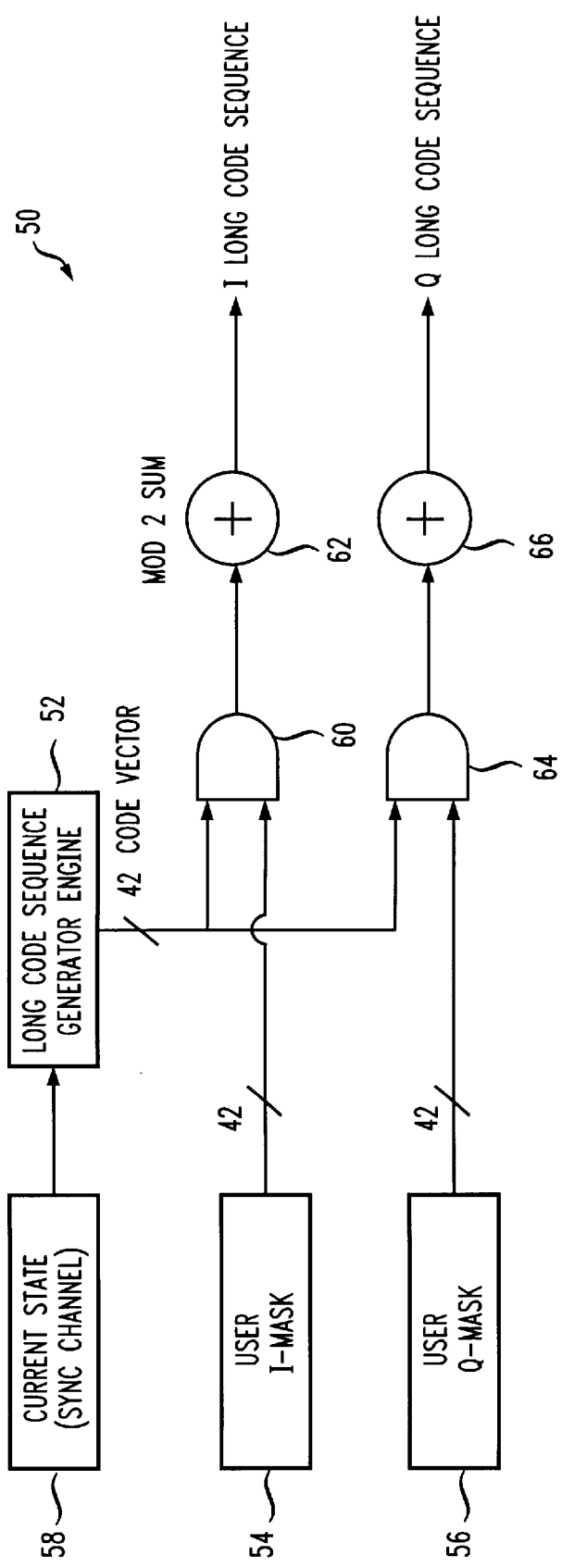
FIG. 5 shows a proposed complex scrambling code generation system.
Figure 6:
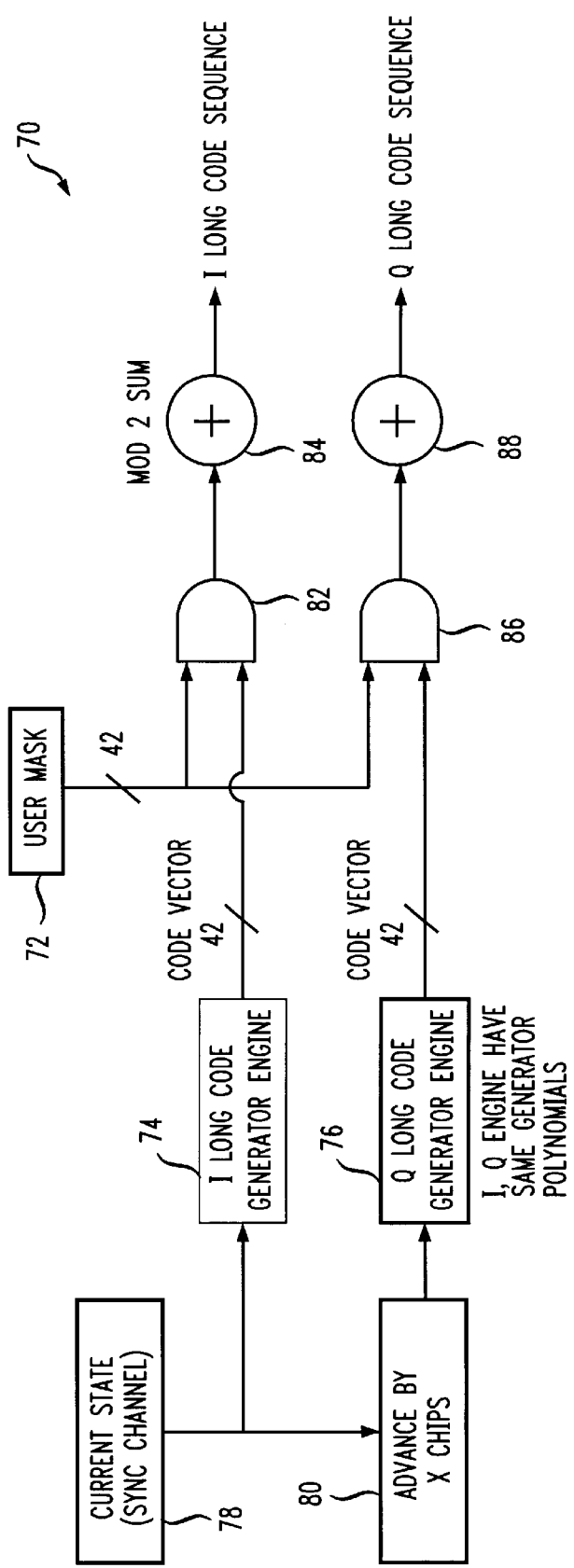
FIG. 6 shows another proposed complex scrambling code generation system.
Figure 7:
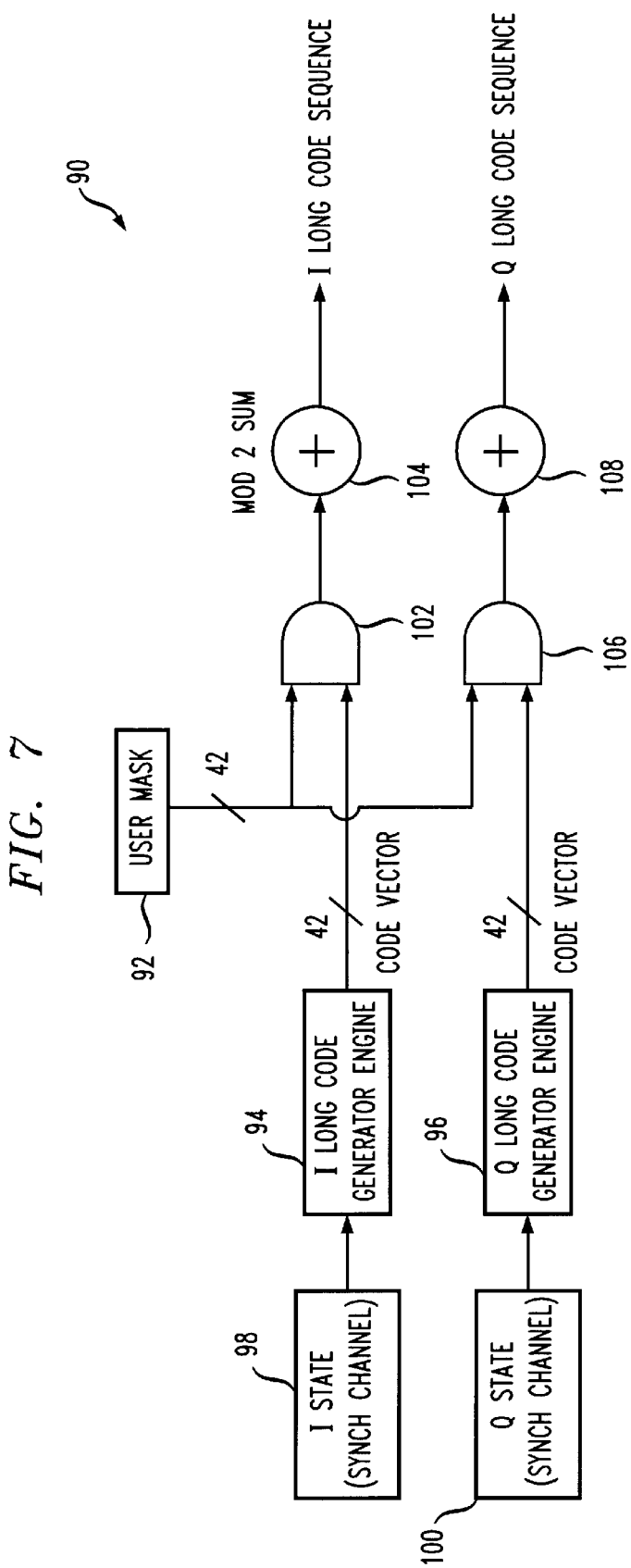
FIG. 7 shows yet another proposed complex scrambling code generation system according to the principles of the present invention.

In this embodiment, the complex short code sequence (I and Q components) are distinct PN codes which are generated using two independent generator polynomials of degree 15 as described in IS-95B and 15-bit linear feedback shift registers similar to those described in FIG. 4. Alternative techniques for generating the complex short and complex long codes are possible. The complex short PN code components are chip synchronous, but otherwise independent of each other.

In some embodiments, the complex scrambling code sequence is processed using a processing block 144 to alter the complex scrambling code sequence before performing a mixing or complex multiplication 142 with the data streams $D_i(t)$ and $D_q(t)$ in order to improve the peak power to average power ratio of the transmission. In doing so, the modulation scheme is effectively changed. For example, the processing block 144 could decimate the Q scrambling code by a factor of 2 and then multiply the resulting sequence by a repeating cover sequence of -1 and 1 and the I scrambling code sequence. The resulting Q scrambling code sequence produced from the processing block 144 would be used in the complex multiplication of the complex scrambling code and the data streams $D_i(t)$ and $D_q(t)$. In doing so, the complex scrambling code would exhibit phase transitions which could reduce the peak to average power ratio. Specifically, during even chip times, the complex scrambling chip will be one of four quadrature phase shift keying (QPSK) symbols. During odd chip times, the complex scrambling code is limited to s+/−90 degree phase shift from the previous complex scrambling chip. As such, the complex scrambling code sequence can be generated using a hybrid phase shift keying approach which is a hybrid combination of QPSK and binary phase shift keying (BPSK). Depending on the embodiment, the processing block 144 could alter both the I scrambling code sequence and/or the Q scrambling code sequence in different ways to effectively alter the modulation scheme or provide other desired operational characteristics. Moreover, in some embodiments, the processing block 144 would not be performed and the complex scrambling code is directly provided to the complex multiplier 142.

In this embodiment, the I scrambling code sequence and the Q scrambling code sequence are used in the complex multiplication by the complex multiplier 142. The complex multiplier 142 performs a complex multiplication on the I and Q data streams $D_i(t)$ and $D_q(t)$ using the complex scrambling code sequence to provide the I and Q spread spectrum signals $y_i(t)$ and $y_q(t)$ which are modulated and transmitted to the base station after being added together. The complex multiplication 142 can produce the I spread spectrum signal $y_i(t)=(D_i(t)*I$ scrambling code sequence)−$(D_q(t)*Q$ scrambling code') and the Q spread spectrum signal $y_q(t)=(Di(t)*Q$ scrambling code')+$(D_q(t)*I$ scrambling code sequence). The "'" after Q scrambling code sequence denotes that the Q scrambling code sequence in this embodiment has been altered by the processing block 144. Other embodiments are possible. Alternatively, the scrambling code sequence generation system can be performed in a system where the complex multiplier 142 is simply a multiplication performed on the I path 132 between the data stream $D_i(t)$ and the I scrambling code sequence and a multiplication on the Q path 134 between the Q scrambling code sequence and the data stream $D_q(t)$. In such an embodiment, the multiplication between with the data streams can occur at other locations, such as after the generation of the complex long code sequence. Furthermore, the $D_i(t)$ and $D_q(t)$ information signals are different, but alternative embodiments could have $D_i(t)$ equal to $D_q(t)$.

Because the above described embodiment uses only one long code generator engine 126 and one user mask 124, the system can be backward compatible with the TIA/EIA-95-B standard. The system reduces the self-interference problem because the relative time offset between the user's I and Q scrambling codes will be sufficiently large (>than one period of the short code generators) due to the existence of the complex short code. The mutual interference problem is reduced because the I and Q scrambling code sequences are unique among users, and one user's I code will be un-correlated with another user's Q code due to the use of different user masks and the different I and Q components of the complex short code sequence.

In addition to the embodiment described above, alternative configurations of the scrambling code sequence generation system are possible according to the principles of the present invention which omit and/or add components and/or use variations or portions of the described scrambling code generation system. For example, the above described embodiment is described as using a 42-bit user mask, 42-bit code vector and 15-bit short code sequences, but alternative mask, code vector, and code sequences are possible. Moreover, in this embodiment, the code sequences are described as long and short, but alternative embodiments could produce the complex scrambling code using first and second complex code sequences with different relative lengths or equal lengths. Furthermore, the complex scrambling code as well as the long and short code sequences are described in terms of two components (I and Q), but other embodiments can use additional components and/or different numbers of components which are combined in different fashions to enable various forms of modulation.

Additionally, the long code generator engine is described as receiving the current state vector on the sync channel from the base station, but alternative schemes are possible where the current state vector is received from different sources. The long code generator 122 is further described as using the code vector from the long code generator shift register to produce the long code sequence by taking an inner product using the AND gate arrangement 128 and modulo 2 summer 130 of the code vector 126 and the user mask 124. Alternative configurations are possible for generating the long code and short code sequences.

Furthermore, the complex scrambling code sequence generation system can operate in various operating environments. For example, the complex scrambling code sequence generation system has been described as operating in a transmit path of the reverse link (at the wireless unit) of a CDMA system. The complex scrambling code sequence generation system is also located at the receive path (base station) of the reverse link. On the receive path, the complex scrambling code is used in performing a de-spreading and/or de-scrambling of the spread spectrum signals as would be understood by one of skill in the art with the benefit of this disclosure. In an embodiment on the receive path, the complex scrambling code sequence generation system 120 provides the complex scrambling code sequence, and a corresponding complex multiplier 142 performs a complex multiplication between the conjugates of the components of the complex scrambling code sequence and the I and Q spread spectrum signals to produce the I and Q data signals Di and Dq (shown in parenthesis) as would be understood by one of skill in the art. Moreover, certain embodiments of the complex scrambling code generation system can be used on a transmit path (base station) and a receive path (wireless unit) on the forward link of a wireless communications system.

Additionally, the complex scrambling code sequence generator has been described as generating I and Q scrambling code sequences which are then mixed with the data signals Di(t) and Dq(t). Different implementations are possible where the first complex code sequence, the second complex code sequence and the data signals Di(t) and Dq(t) can be mixed together in different ways. For example, if the multiplier 142 is simply two multipliers (one on each of the I and Q paths), the data signals Di(t) and Dq(t) could be multiplied with the I and Q short code sequences respectively, then the corresponding components of the resulting sequence would be multiplied with the corresponding components of the complex long code sequence.

As would be understood by one of ordinary skill in the art, the complex scrambling code sequence generation system has been described using a particular configuration of distinct components, but it should be understood that the scrambling code generation system and portions thereof can be implemented in application specific integrated circuits, software-driven processing circuitry, firmware or other arrangements of discrete components as would be understood by one of ordinary skill in the art with the benefit of this disclosure. Although in the illustrative embodiment is shown with a particular circuitry, the system can use different components which together perform similar functions when compared to the circuitry shown. What has been described is merely illustrative of the application of the principles of the present invention. Those skilled in the art will readily recognize that these and various other modifications, arrangements and methods can be made to the present invention without strictly following the exemplary applications illustrated and described herein and without departing from the spirit and scope of the present invention.

What is claimed is:

1. A method of producing a complex scrambling code sequence for processing at least one information signal in a wireless communications system, said method comprising the steps of:
   generating a first complex code sequence having at least two components where at least a first component of said first complex code sequence is a time offset version of a second component of said first complex code sequence;
   generating a second complex code sequence having at least two components; and
   combining corresponding components of said first complex code sequence and said second complex code sequence to produce a complex scrambling code sequence.

2. The method of claim 1 wherein said step of generating a first complex code sequence includes the steps of:
   receiving a state vector;
   generating a code vector using said state vector;
   combining said code vector with a user mask to produce a long code sequence;
   producing said long code sequence on a first and second path;
   producing a relative delay between long code sequences on said first and second paths to produce a first long code sequence as said first component of said first complex code sequence on said first path and a second long code sequence on said second path as said second component of said first complex code sequence.

3. The method of claim 2 wherein said step of generating a second complex code sequence further including the step of:
   using two independent polynomial generators to produce a first short code sequence and a second short code sequence.

4. The method of claim 3 wherein said first step of combining further including the step of:
   performing a multiplication where said first long code sequence and said first short code sequence are products to produce a first component of said complex scrambling code sequence on said first path; and
   performing a multiplication where said second long code sequence and said second short code sequence are products to produce a second component of said complex scrambling code sequence on said second path.

5. The method of claim 4 further including the step of:
   performing a multiplication with said first component of said complex scrambling code sequence and said at least one information signal as products.

6. The method of claim 4 further including the step of:
   performing a multiplication with said second component of said complex scrambling code sequence and said at least one information signal as products.

7. The method of claim 4 further including the step of:
   performing a complex multiplication using at least a portion of said complex scrambling code sequence and said at least one information signal.

8. The method of claim 4 wherein said step of providing further including the step of:
   performing a complex multiplication using said complex scrambling code sequence and two information signals.

9. The method of claim 1 further including the step of:
   providing at least one spread spectrum signal using at least a portion of said complex scrambling code sequence and said at least one information signal.

10. The method of claim 1 further including the step of:
    providing two spread spectrum signals using said complex scrambling code sequence and two information signals.

11. The method of claim 1 further including the step of:
    providing said at least one information signal using at least a portion of said complex scrambling code sequence and at least one spread spectrum signal.

12. The method of claim 1 further including the step of:
    providing two information signals using said complex scrambling code sequence and two spread spectrum signals.

13. A complex scrambling code sequence generation system used in processing at least one information signal, said system comprising:
    a first complex code sequence generator producing a complex code sequence having at least two components where at least a first component of said first complex code sequence is a time offset version of a second component of said first complex code sequence;
    a second complex code sequence generator producing a second complex code sequence having at least two components; and
    a combining arrangement combines corresponding components of said first complex code sequence and said second complex code sequence to produce a complex scrambling code sequence.

14. The system of claim 13 further including:

a second combining arrangement combines at least a portion of said complex scrambling code sequence and said at least one information signal to produce at least one spread spectrum signal.

15. The system of claim 13 further including:

a second combining arrangement combines at least a portion of said complex scrambling code and at least one spread spectrum signal to produce said at least one information signal.

16. A method of producing a complex scrambling code sequence for processing at least one information signal in a wireless communications system, said method comprising the steps of:

receiving a state vector;

generating a code vector using said state vector;

combining said code vector with a user mask to produce a first complex code sequence;

producing a relative delay between versions of said first complex code sequence to produce a first component and a second component of said first complex code sequence;

generating a second complex code sequence having at least two components; and combining corresponding components of said first complex code sequence and said second complex code sequence to produce a complex scrambling code sequence.

17. A method of producing a complex scrambling code sequence for processing at least one information signal in a wireless communications system, said method comprising the steps of:

generating a first complex code sequence having at least a first component and a second component which are offset in time;

using two independent polynomial generators to produce at least a first short code sequence and a second short code sequence;

performing a multiplication where said first component of said first complex code sequence and said first short code sequence are products to produce a first component of said complex scrambling code sequence; and performing a multiplication where said second component of said first complex code sequence and said second short code sequence are products to produce a second component of said complex scrambling code sequence.

\* \* \* \* \*